(12) United States Patent
Sesser et al.

(10) Patent No.: US 7,370,667 B2
(45) Date of Patent: May 13, 2008

(54) FLOW THROUGH PRESSURE REGULATOR WITH PINCH VALVE

(75) Inventors: George L. Sesser, Walla Walla, WA (US); Craig Nelson, Walla Walla, WA (US); Cliff P. Ungerecht, Walla Walla, WA (US); Michael Youngberg, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 73 days.

(21) Appl. No.: 11/512,212

(22) Filed: Aug. 30, 2006

(65) Prior Publication Data

US 2006/0283506 A1    Dec. 21, 2006

Related U.S. Application Data

(62) Division of application No. 10/856,985, filed on Jun. 1, 2004, now Pat. No. 7,168,444.

(51) Int. Cl.
*G05D 16/08* (2006.01)

(52) U.S. Cl. .......................... 137/505.25; 137/505.47; 251/331

(58) Field of Classification Search ........... 137/505.25, 137/505.46, 505.47; 251/61, 331, 4–10
See application file for complete search history.

(56) References Cited

U.S. PATENT DOCUMENTS

| | | | |
|---|---|---|---|
| 2,429,546 A | 10/1947 | Martin | |
| 2,579,982 A * | 12/1951 | Trump | 251/256 |
| 2,827,919 A | 3/1958 | Rice | |
| 2,890,855 A | 6/1959 | Little | |
| 2,986,160 A * | 5/1961 | Acomb | 137/505.22 |
| 3,759,483 A | 9/1973 | Baxter | |
| 3,828,822 A * | 8/1974 | Witte | 137/505.21 |
| 4,071,039 A | 1/1978 | Goof | |
| 4,262,876 A | 4/1981 | Willart | |
| 4,544,127 A | 10/1985 | Szabó | |
| 4,682,755 A | 7/1987 | Bernstein et al. | |
| 4,884,595 A | 12/1989 | Grove | |
| 5,007,446 A | 4/1991 | Grove | |
| 5,215,286 A * | 6/1993 | Kolenc | 251/58 |
| 5,257,646 A | 11/1993 | Meyer | |
| 5,402,823 A | 4/1995 | Cole | |
| 5,441,231 A | 8/1995 | Payne et al. | |
| 5,875,815 A | 3/1999 | Ungerecht et al. | |
| 6,536,738 B2 | 3/2003 | Inoue et al. | |
| 7,168,444 B2 * | 1/2007 | Sesser et al. | 137/505.25 |
| 2003/0010946 A1 | 1/2003 | Furukawa et al. | |

* cited by examiner

*Primary Examiner*—Stephen M. Hepperle
(74) *Attorney, Agent, or Firm*—Nixon & Vanderhye, PC (57) ABSTRACT

A fluid pressure regulator includes a regulator housing having an inlet end and an outlet end; a flexible flow tube extending between the inlet end and the outlet end; a hollow piston located at a downstream location relative to a mid-portion of the flow tube in a direction of flow of fluid through the regulator housing; a first chamber above the piston and a second chamber below the piston; a passage establishing fluid communication between the outlet end and the first chamber; and at least one pinch arm pivotally mounted at one end within the regulator housing and movable in response to movement of the piston by an increase in fluid pressure in the first chamber so that an opposite end of the at least one pinch arm will pinch a portion of the flow tube and thereby restrict flow through the flow tube.

5 Claims, 6 Drawing Sheets

FLOW THROUGH PRESSURE REGULATOR WITH PINCH VALVE

This application is a divisional of application No. 10/856,985, filed Jun. 1, 2004 now U.S. Pat. No. 7,168,444.

BACKGROUND OF THE INVENTION

This invention relates to irrigation equipment and particularly to water pressure regulators for use with sprinkler devices.

It is well known to use fluid pressure regulators on irrigation systems in order to provide constant outlet pressure over a wide range of inlet pressures. The need for such regulators is particularly acute in low pressure systems because a slight variation in pressure causes a much greater variation in discharge than the same system operating at high pressure.

The assignee of this invention currently manufactures and sells a fluid pressure regulator of the flow through type, having an inlet at one end of a tubular housing and an outlet at the other end of the tubular housing. An annular seat, supported by a plurality of radial struts centrally of the flowpath, is fixed within the housing and is adapted to be engaged by a tubular plunger which is spring biased away from the seat (in the direction of fluid flow) so that under normal conditions, maximum flow through the regulator is permitted. In the event of a pressure surge, the plunger is moved by back pressure at the regulator outlet, within a diaphragm chamber, against the action of the spring (and against atmospheric pressure), toward the regulator seat, thereby decreasing the flow through the regulator. As the outlet pressure subsequently decreases, the plunger moves in an opposite direction under the influence of the spring. The plunger thus continuously seeks an equilibrium position where the opposed pressures on the piston are substantially equal. See, for example, commonly owned U.S. Pat. No. 5,257,646. Regulators of this type, however, are prone to clogging by grass and other fibrous debris that tends to "hairpin" about the radial webs or struts supporting the seat in the center of the flowpath. It would therefore be desirable to eliminate any radially oriented webs or struts in pressure regulator devices to minimize the potential for clogging.

BRIEF DESCRIPTION OF THE INVENTION

The present invention eliminates the center-located regulator seat and its supporting radial supports, or struts, in favor of a piston-actuated pinch mechanism that constricts the diameter of a flexible flow tube within the pressure regulator housing. More specifically, the pressure regulator in accordance with one exemplary embodiment of this invention includes a tubular housing having a cap component and a main body component that are secured together by a threaded clamp ring. The pressure regulator has an inlet end, and an outlet end, both of which may be internally (or externally) threaded to facilitate attachment to pipes, sprinklers, or other devices. The flexible flow tube is secured at opposite ends of the regulator and a support sleeve is received over the flow tube to provide radial support therefor, with the exception of an open middle portion that permits operation of a pair of pinch arms pivotally secured within the main body, upstream of the pinch area of the flow tube. The pinch arms extend axially along the flow tube but also include diametrically opposed pinch tabs that extend perpendicularly from the pinch arms so that they may engage the flow tube through the center openings in the support sleeve.

The hollow piston is arranged over the upper end of the support sleeve and a coil spring extends between a lower portion of the main body component and the underside of a radial flange on the piston, thus biasing the piston in an upward direction, i.e., in a direction toward the regulator outlet end. Note that references to "upper" or "upwardly" or "lower" or "downwardly," etc. are merely intended to conform to the regulator as oriented in the drawings, and are not to be regarded necessarily as limiting.

The lower end of the piston is formed with a downwardly and outwardly tapered, annular cam surface that is oriented to engage complementary surfaces on the pinch arms, while an annular diaphragm is arranged radially between an upper edge of the piston and an upper edge of the main body component. More specifically, a reinforced, radially inner edge of the diaphragm is located in a radially outer portion of the top surface of the piston while the radially outer edge of the diaphragm is seated in a groove in the upper edge of the main body component, and clamped in place by the cap component. This arrangement establishes a first fluid chamber generally above a radial flange portion of the piston that is sealed relative to a second chamber below the flange portion of the piston. A passage fluidly connects the regulator outlet end and the upper chamber. Thus, the position of the piston is determined by the competing forces of the fluid pressure in the upper fluid chamber at the outlet end of the regulator exerting force on the piston in one direction, and the coil spring exerting force on the piston in an opposite direction.

Thus, as the outlet pressure increases, the pressure in the upper chamber will gradually overcome the opposing force generated by the coil spring, causing the piston to move downwardly, pushing the pinch arms inwardly to restrict flow through the flexible flow tube. As the outlet pressure decreases, the piston may stop or move in the opposite direction to increase flow, depending on the outlet pressure. In this manner, the regulator will constantly seek an equilibrium position that will result in uniform outlet pressure.

With this arrangement, the flexible flow tube is also less prone to clogging and, in addition, a clear line of sight is established along the longitudinal axis of the regulator, thus facilitating visual inspection of the regulator interior for debris and the like.

In another embodiment, the pinch arms are pivotally secured downstream of the pinch area. In this embodiment, the piston is formed with cam arms, with or without rollers on the distal ends of the arms. The cam arms are adapted to engage the pinch arms and to move the arms inwardly to pinch the flexible flow tube substantially as described above. A three-function manual control knob may be provided that would enable shut-off of the flow; regulation of the flow as described above; or lock-up in a wide open position for flushing the regulator.

In still another embodiment, a rigid flow tube is secured within the housing but the tube has a double-bend, directing the flow from the center of the regulator towards one side of the housing and then back to the center. The flow tube is formed at the bend with an opening sealed by a flexible boot. A pinch arm pivotally secured to the rigid flow tube downstream of the pinch area is actuated by a cam on the piston to pivot the pinch arm inwardly to engage the boot and move it towards the opposite fixed side of the bend to thereby restrict flow through the rigid flow tube.

In each of the embodiments, the downstream (or outlet) pressure determines the direction of movement of the piston and hence the pinch arm(s), thereby regulating the flow pressure of the water exiting the regulator.

Accordingly, in one aspect, the invention relates to a fluid pressure regulator comprising a regulator housing having an inlet end and an outlet end; a flexible flow tube extending between the inlet end and the outlet end; a hollow piston located at a downstream location relative to a mid-portion of the flow tube in a direction of flow of fluid through the regulator housing; a first chamber above the piston and a second chamber below the piston; a passage establishing fluid communication between the outlet end and the first chamber; and at least one pinch arm pivotally mounted at one end within the regulator housing and movable in response to movement of the piston by an increase in fluid pressure in the first chamber so that an opposite end of the at least one pinch arm will pinch a portion of the flow tube and thereby restrict flow through the flow tube.

In another aspect, the invention relates to a fluid pressure regulator comprising a regulator housing having an inlet end and an outlet end; a flexible flow tube extending between the inlet and the outlet defining a flow path therebetween; a hollow piston adjacent the outlet end; a first chamber above the piston and a second chamber below the piston; at least one passage establishing fluid communication between the flow path at the outlet end and the first chamber; and a pair of pinch arms pivotally secured in the regulator housing and movable toward and away from the flexible tube in response to axial movement of the piston caused by an increase in fluid pressure in the first chamber to thereby restrict or expand flow through the flow tube depending on direction of movement of the piston; and further wherein an unobstructed line of sight is established through the flow tube, along a longitudinal axis of the regulator housing, from the inlet end to the outlet end, when there is no fluid in the first chamber.

In another aspect, the invention relates to a fluid pressure regulator comprising a regulator housing having an inlet end and an outlet end; a flexible, straight flow tube extending between the inlet and the outlet; and a pair of pinch arms pivotally secured at a downstream location relative to the mid-portion of the flow tube and movable radially inwardly or outwardly to restrict or expand flow through the flow tube in response to an increase or decrease, respectively, in fluid pressure; and wherein an unobstructed line of sight is established through the flow tube, along a longitudinal axis of the regulator housing, from the inlet end to the outlet end when the pinch arms are in a radially outward position.

In still another aspect, the invention relates to a fluid pressure regulator comprising a regulator housing having an inlet end and an outlet end; a flow tube extending between the inlet end and the outlet end, the flow tube incorporating a double bend intermediate opposite ends of the flow tube, and having an opening therein on one side of the double bend; a flexible boot covering the opening; a hollow piston located at a downstream location relative to a mid-portion of the flow tube in a direction of flow of fluid through the regulator housing; a first chamber above the piston, and at least one passage establishing fluid communication between the outlet end and the first chamber; and a pinch arm pivotally mounted at one end within the regulator housing and movable in response to movement of the piston by an increase in flu-d pressure in the first chamber so that an opposite end of the pinch arm will project through the opening and move the flexible boot towards the other side of the double bend to thereby restrict flow through the flow tube.

The invention will now be described in detail in connection with the drawings identified below.

DETAILED DESCRIPTION OF THE INVENTION

Figure 1:
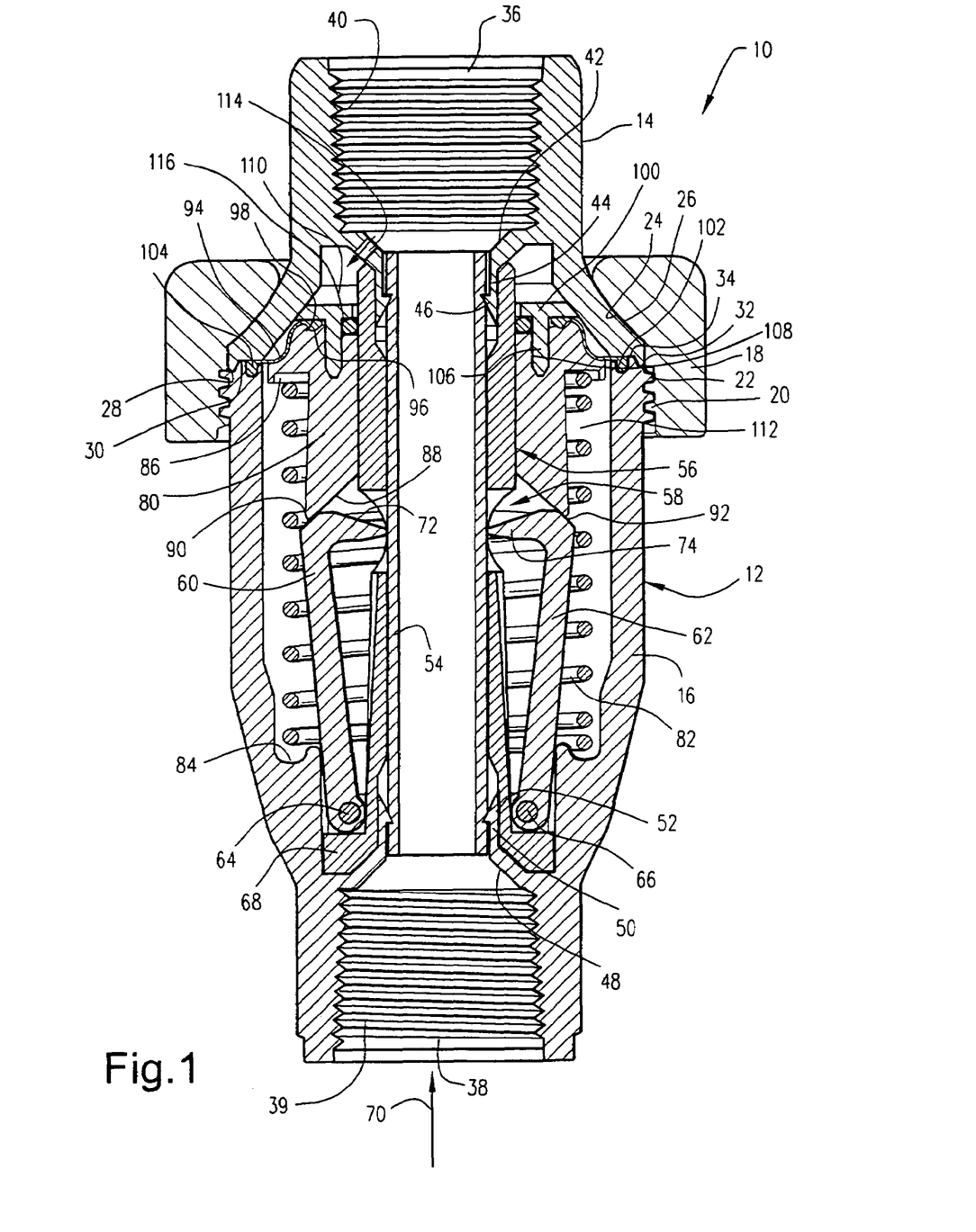
FIG. 1 is a longitudinal cross section of a pressure regulator in accordance with an exemplary embodiment of the invention.

With reference to FIG. 1, a fluid pressure regulator 10 in accordance with a first exemplary embodiment of this invention includes a tubular housing 12 including a cap component 14 and a main body component 16 secured together by means of a donut-shaped clamp ring 18. More specifically, the clamp ring 18 may be telescoped over the cap component 14, enabling a threaded connection via the internal thread 20 on the clamp ring and the external thread 22 on the main body component 16 of the housing 12. As the clamp ring 18 is threaded onto the main body component 16, the tapered surface 24 on the inside of the clamp ring 18 engages similarly tapered surface 26 on the cap component 14 so that the cap component 14 is clamped to the main body component 16. Further in this regard, offset radial surfaces 28 and 30 on the cap component 14 engage offset radial surfaces 32 and 34, respectively, of the main body component 16 when the two sections are clamped together by the ring 18.

The pressure regulator 10 is of the flow-through type, with an outlet end 36 provided at one end of the cap component 14 and an inlet end 38 provided at the distal end of the main body component 16. The inlet end 38 may be threaded internally (at 39) or externally in any of a number of thread configurations and sizes to facilitate attachment to variously sized hoses or other conduits. The outlet end 36 is shown to include internal threads 40, adapted to receive in a typical arrangement, external threads on a rotary sprinkler, fixed spray head, or other sprinkler device.

Inside the cap component 14 at the outlet end 36, there is an inwardly tapered surface 42 that leads to a reduced diameter tubular connector 44 terminating at an internal annular barb 46. A similar arrangement is provided at the inlet end 38 where an internal tapered surface 48 leads to a second reduced diameter tubular connector 50 terminating at an internal annular barb 52. A uniform-diameter flexible plastic or rubberized flow tube 54 extends between the connectors 44, 50, with the opposite ends of the tube inserted into the connectors and held by the barbs 46, 52, respectively.

Figure 3:
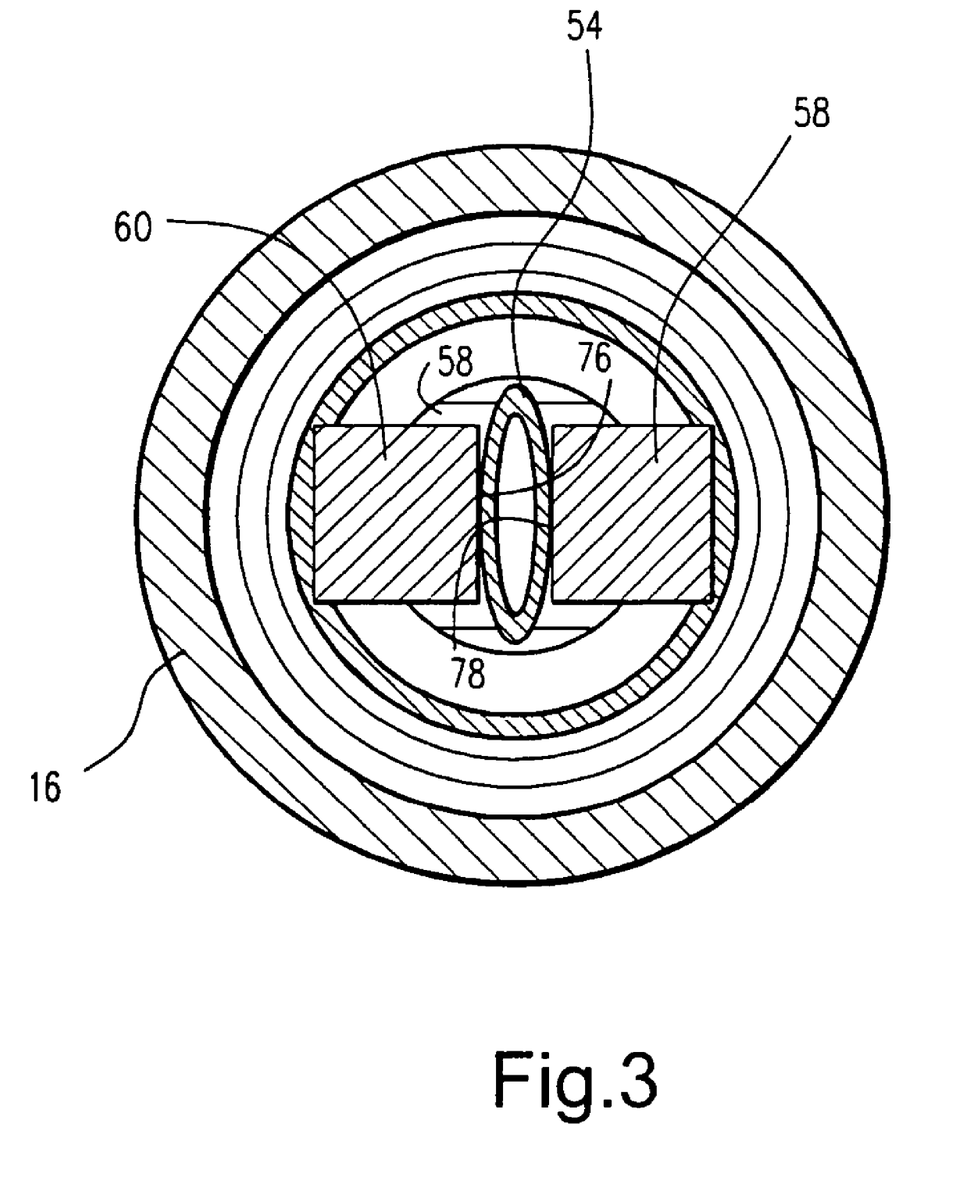
FIG. 3 is a cross section taken along the line 3-3 in FIG. 2, simplified for the sake of clarity.

A support sleeve 56 is received over the exterior surfaces of the reduced diameter connectors 44, 50 in a friction-fit engagement. The support sleeve 56 surrounds a major portion of the flow tube 54 between the connectors 44, 50, recognizing that the free ends of the sleeve 56 are enlarged internally to accommodate the connectors 44, 50. In addition, the center area of the support sleeve 56 is formed with a center opening 58 to permit operation of a pair of pinch arms 60, 62. The latter are pivotally secured via pins 64, 66 to an enlarged annular base portion 68 of the support sleeve 56 (i.e., adjacent the inlet end 38) seated in the radial space between the main body 16 and the connector 50. Pinch arms 60, 62 thus extend from pivot pins 64, 66 axially in the flow direction (indicated by arrow 70) through the regulator. More specifically, the pinch arms 60, 62 extend axially (i.e., generally parallel to the flow tube 54) to the center area of the flow tube 54, where integral and diametrically opposed pinch tabs 72, 74 extend perpendicularly to the arms 60, 62, so that they may engage the flow tube 54 through the opening 58 in the support sleeve 56. As best seen in FIG. 3, the tabs 72, 74 have respective flat tube engaging surfaces 76, 78 that tangentially engage the flow tube, and that pinch the flow tube 54 in the manner shown in FIG. 3 and as described further below. It will be understood, however, that the flow tube 54 could be pinched by a single pinch arm pivotally secured adjacent the inlet end or outlet end of the regulator.

Figure 2:
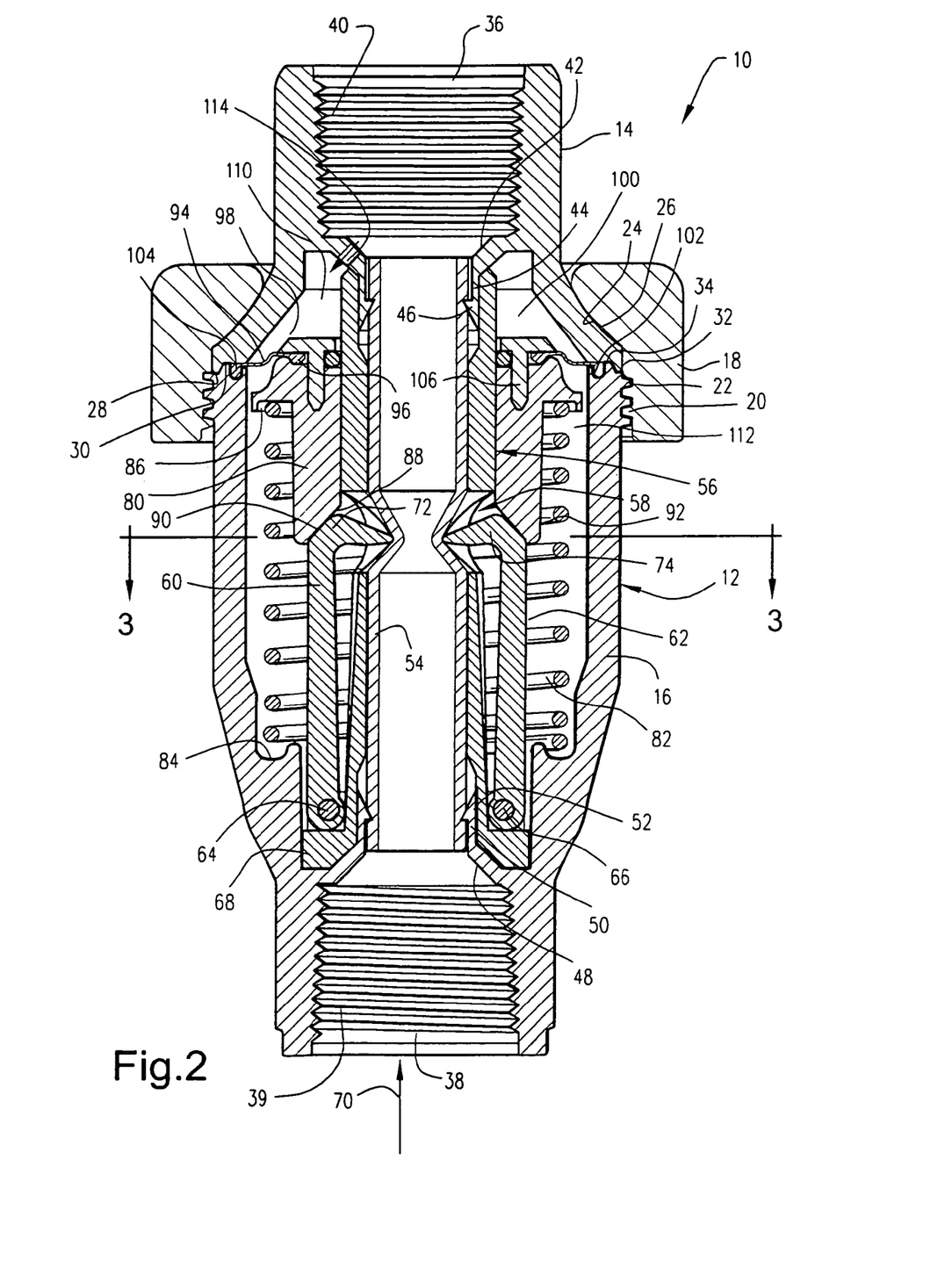
FIG. 2 is a cross section similar to FIG. 1 but with the flow tube in a pinched condition.

Returning to FIGS. 1 and 2, a hollow piston 80 is telescoped over the upper end of the support sleeve 56, and generally above the pinch arms 60, 62. A coil spring 82 extends between an internal annular groove 84 in the lower part of the main body component 16 axially and radially spaced from the pivot pins 64, 66, and the underside of an annular shoulder or flange 86 on the piston 80, biasing the piston upwardly in the flow direction to the position shown in FIG. 1. When not in operation, this is an at-rest or no-flow position. When in operation, this is a wide open or maximum flow position. The lower end of the piston 80 is formed with a downwardly and outwardly tapered, annular cam surface 88 that is oriented to engage complementary surfaces 90, 92 on the pinch arms 60, 62, respectively, adjacent the pinch tabs 72, 74. An annular diaphragm 94 is arranged between the upper lip of the piston 80 and the upper edge of the main body component 16 of the housing 12. Specifically, a reinforced, radially inner edge 96 of the diaphragm 94 is located in a half-groove 98 in the radially outer portion of the top surface of the piston and held in place by an annular retainer 100, while the radially outer edge 104 of the diaphragm is seated in a groove 102 in the upper edge 34 of the main body component 16 and clamped in place by the lower edge 30 of the cap component 12. Note that retainer 100 is a flat annular, disk-like component, with an axially extending skirt 106 that is pressed within a similarly shaped annular groove 108 formed in the top surface of the piston 80. This arrangement establishes a first chamber 110 generally above the piston and a second chamber 112 below the piston. A passage 114 extends through the tapered surface 42, thereby exposing the chamber 110 to the fluid pressure in the outlet end of the regulator. It will be appreciated that fluid in chamber 110 will exert a downward force on the piston (as viewed in the Figures), and spring 82 will exert a force on the piston in an upward or opposite direction. An O-ring 116 located beneath a radially inner end of the retainer 100, and engaged with the outer surface of sleeve 56, prevents water in chamber 110 from running along the outer surface of the sleeve 56 and into the lower or second chamber 112.

In operation, fluid will flow (in the direction of flow arrow 70), into the regulator 10 via inlet end 38 and out of the regulator via outlet end 36. Fluid will also pass at a regulated or downstream pressure through the passage 114 and into the upper chamber 110 above the piston 80. When this regulated or downstream pressure increases, the pressure in chamber 110 will also increase and, depending on the calibration of spring 82, will overcome the biasing force of the spring, thus causing the piston 80 to move downwardly so as to engage the pinch arms 60 and 62, resulting in an inward pivoting movement of the pinch arms from their normal retracted position (FIG. 1), such that tabs 72, 74 will move radially inwardly to pinch the flow tube 54 and decrease flow, as seen in FIG. 3. As the regulated outlet pressure subsequently decreases, the force generated by spring 82 will gradually move the piston 80 upwardly, thereby allowing the pinch arms 60, 62 to move outwardly so as to increase the flow area through the flow tube 54. Thus, as the flow conditions change, the regulator 10 will continuously adjust, seeking an equilibrium position to provide a uniform pressure at the outlet end 36 of the regulator 12.

One additional feature of the flow regulator that results from the internal construction described above is that the inlet end 38, flow tube 54, and outlet end 36 remain clear, minimizing the potential for debris build-up within the regulator. Because of the unobstructed sight line along the longitudinal axis of the regulator when the pinch arms are in the retracted position, it is a simple matter for a user to determine visually whether or not there is any debris or other obstruction lodged within the regulator.

Figure 4:
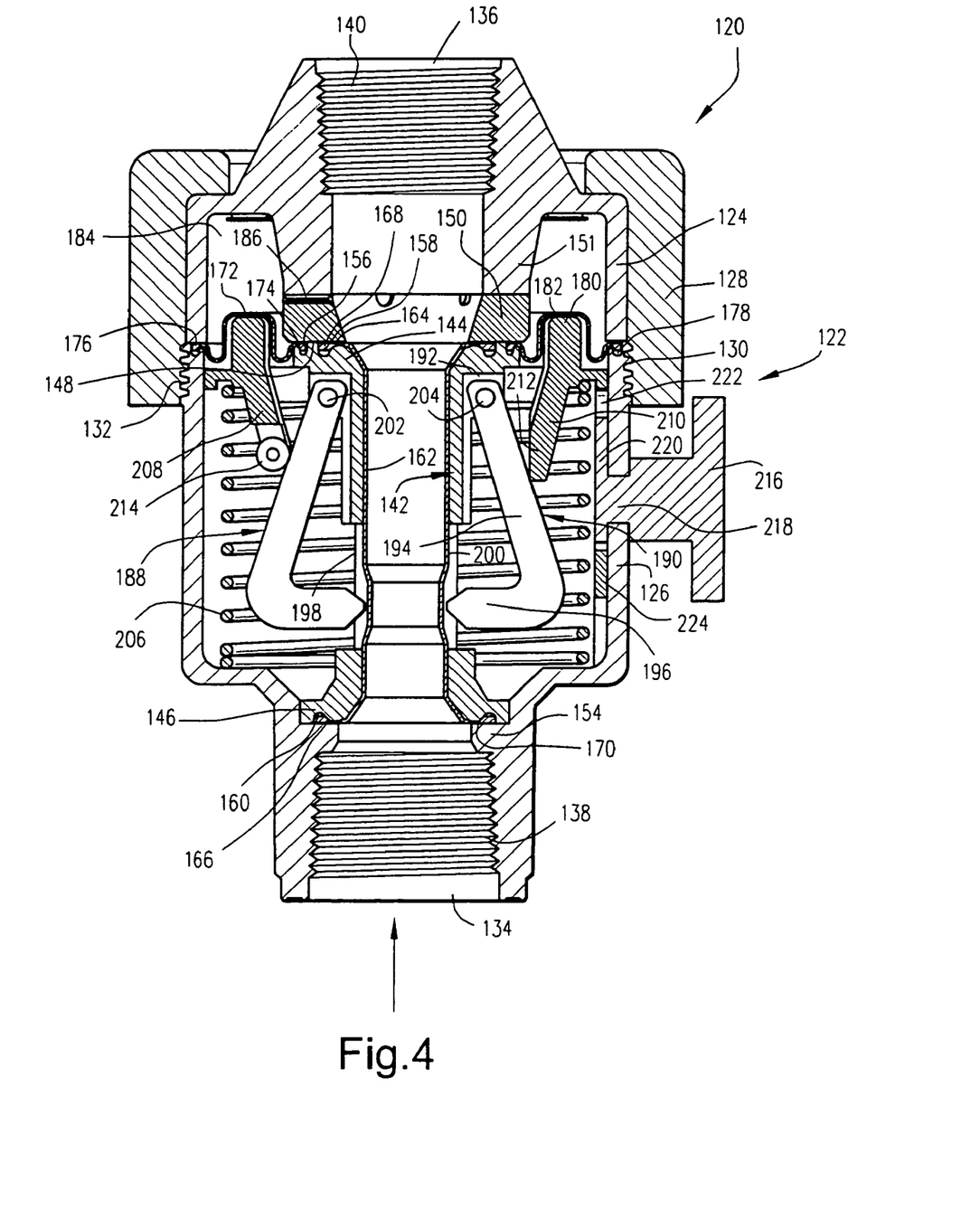
FIG. 4 is a longitudinal cross section of a pressure regulator in accordance with a second embodiment of the invention.

FIG. 4 illustrates an alternative embodiment of the invention. The fluid pressure regulator 120 includes a tubular housing 122 that is again made up of a cap component 124 and a main body component 126 secured together by means of a donut-shaped threaded clamp ring 128. Here again, the clamp ring is telescoped over the cap component 124, enabling a threaded connection via the internal thread 130 on the clamp ring and the external thread 132 on the main body component 126.

The pressure regulator 120 includes an inlet end 134 and an outlet end 136. The inlet end 134 is also threaded internally at 138 to facilitate attachment to variously sized hoses or other conduits. As in the first-described embodiment, the arrangement may be reversed such that the inlet end 134 is externally threaded for a coupling to a correspondingly threaded hose or conduit.

The outlet end 136 is also illustrated with internal threads 140 that is adapted to receive the external threads on a rotary sprinkler, fixed spray head or other sprinkler device.

An internal tubular support 142 is formed with radial flanges 144, 146 at opposite ends of the support. The upper flange 144 is engaged by the lower edge 148 of an internal annular ring component 150 located adjacent an annular internal flow passage wall 151 in the upper housing part 124. The lower flange 146 of the support 142 is engaged by an internal radial flange 154 in the lower housing part 126. Thus, when the housing parts 124, 126 are secured via the clamp ring 128, the tubular support 142 is fixed within the housing. The upper radial flange 144 is formed with a pair of outward-facing annular grooves 156, 158. The lower radial flange 146 is formed with a single, outward-facing annular groove 160, the purposes for which will be described below.

A flexible flow tube 162 extends the length of the tubular support 142 and includes radial flanges 164, 166 at opposite ends of the support, the flanges terminating in thickened rings 168, 170, respectively, at the radially outer ends of the flanges. Ring 168 is seated in groove 158, while ring 170 is seated in groove 160. In this manner, the flexible flow tube 162 is held clamped in place between flange 144 and ring 150 at one end and flanges 146 and 154 at the opposite end. An annular diaphragm 172 includes radially inner and outer thickened ring portions 174, 176. The inner ring 174 is seated in annular groove 156 and is also held in place by lower edge 148 of the internal annular ring component 150. The outer ring 176 is seated in an annular groove 178 in the upper edge of the main body component 126 and clamped in place by the lower edge of the cap component 124.

An annular piston 180 is located in the housing 122 for reciprocating, axial movement. The piston has an upper, annular edge 182 that engages the underside of the diaphragm 172 and moves in response to flow pressure in an annular chamber 184 above the diaphragm, between the outer wall of the cap component 124 and the internal flow passage wall 150. A plurality of annularly-spaced passages 186 extend through the ring component 150 and provide fluid communication between the outlet end of the regulator and the chamber 184.

A pair of pinch arms 188, 190 are pivotally secured to a reinforced sleeve portion 192 of the tubular support 142, adjacent the upper or downstream end of the tubular support. These pinch arms each include an angled but generally axially extending portion 194 and a transverse or horizontal pinch portion 196. The pinch portions 196 are located to engage diametrically opposed portions of the flexible flow tube 162, via cutouts 198, 200 in the tubular support 142. The pinch arms 188, 190 are actuated to pivot about pins 202, 204 and to pinch the flow tube when the piston 180 is driven downwardly by increased pressure in the chamber 184, against the bias of coil spring 206. In this regard, the piston 180 is provided with a pair of fixed actuating arms 208, 210 that are aligned with and arranged to engage the angled portions 194 of the pinch arms. The arms may be formed with cam surfaces 212 at their distal ends, or alternatively, fitted with rollers 214, that engage and facilitate the pivoting movement of the pinch arms.

The operation of this embodiment is otherwise similar to the first-described embodiment.

Figure 5:
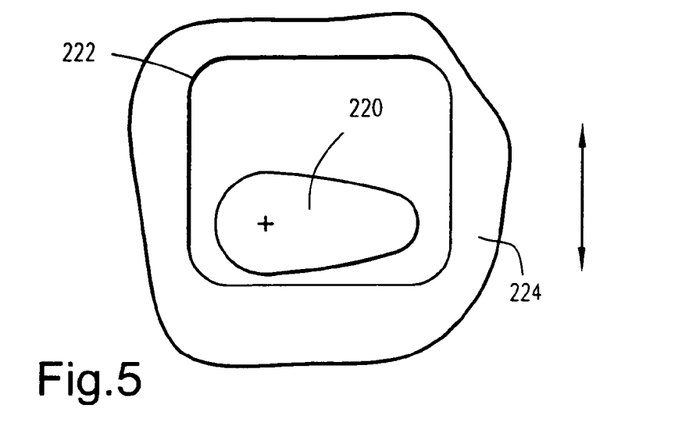
FIGS. 5, 6 and 7 show a manually operated control knob in three different functional positions.
Figure 6:
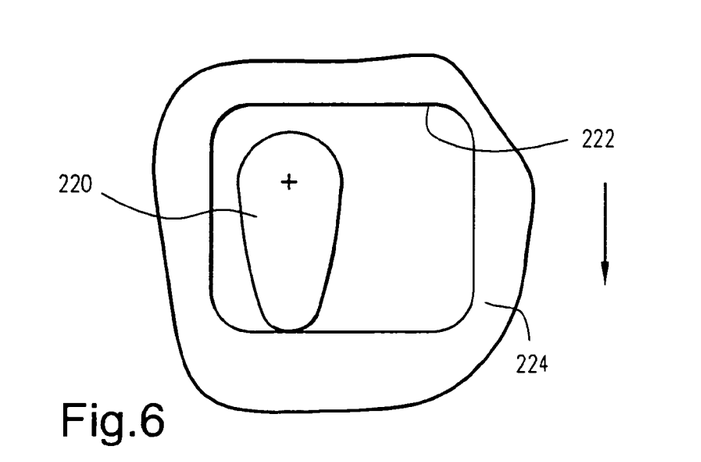
Figure 7:
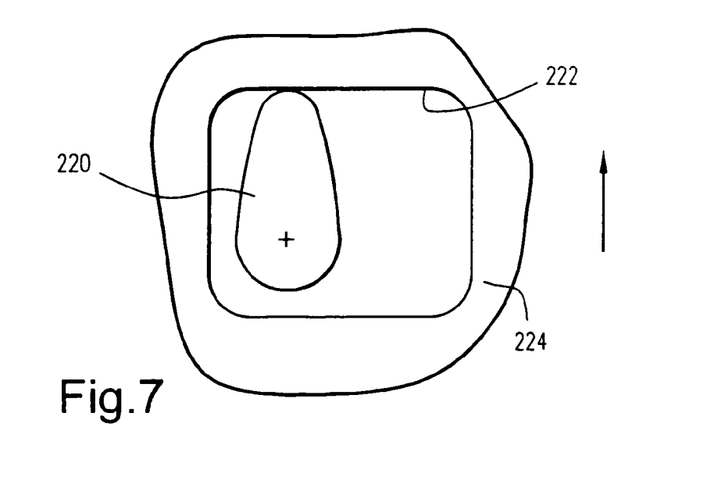

An optional manual shut-off capability is also provided in this embodiment. Specifically, a manually operated knob 216 is mounted in the regulator housing wall, with a shaft portion 218 secured to a cam member 220. The cam 220 is located within a slot or window 222 in an extended skirt portion 224 of the piston 180. With reference to FIGS. 5-7, it can be seen that the cam 220 is rotatable to-perform three functions. First, the cam may be rotated to a substantially horizontal position shown in FIG. 5 where the piston is free to move up or down. In other words, in this position, the cam 220 is set to allow the regulation of outlet pressure. Turning the knob 216 (FIG. 4) ninety degrees in a clockwise position turns the cam 220 to a "cam-down" position where the piston is moved downwardly and held in a shut-off position, as shown in FIG. 6, with flow through the regulator blocked. Turning the knob 216 ninety degrees in a counterclockwise direction (from the position in FIG. 5) turns the cam 220 to a "cam-up" position where the piston is moved upwardly and held in a wide-open flow position for flushing out the regulator.

Figure 8:
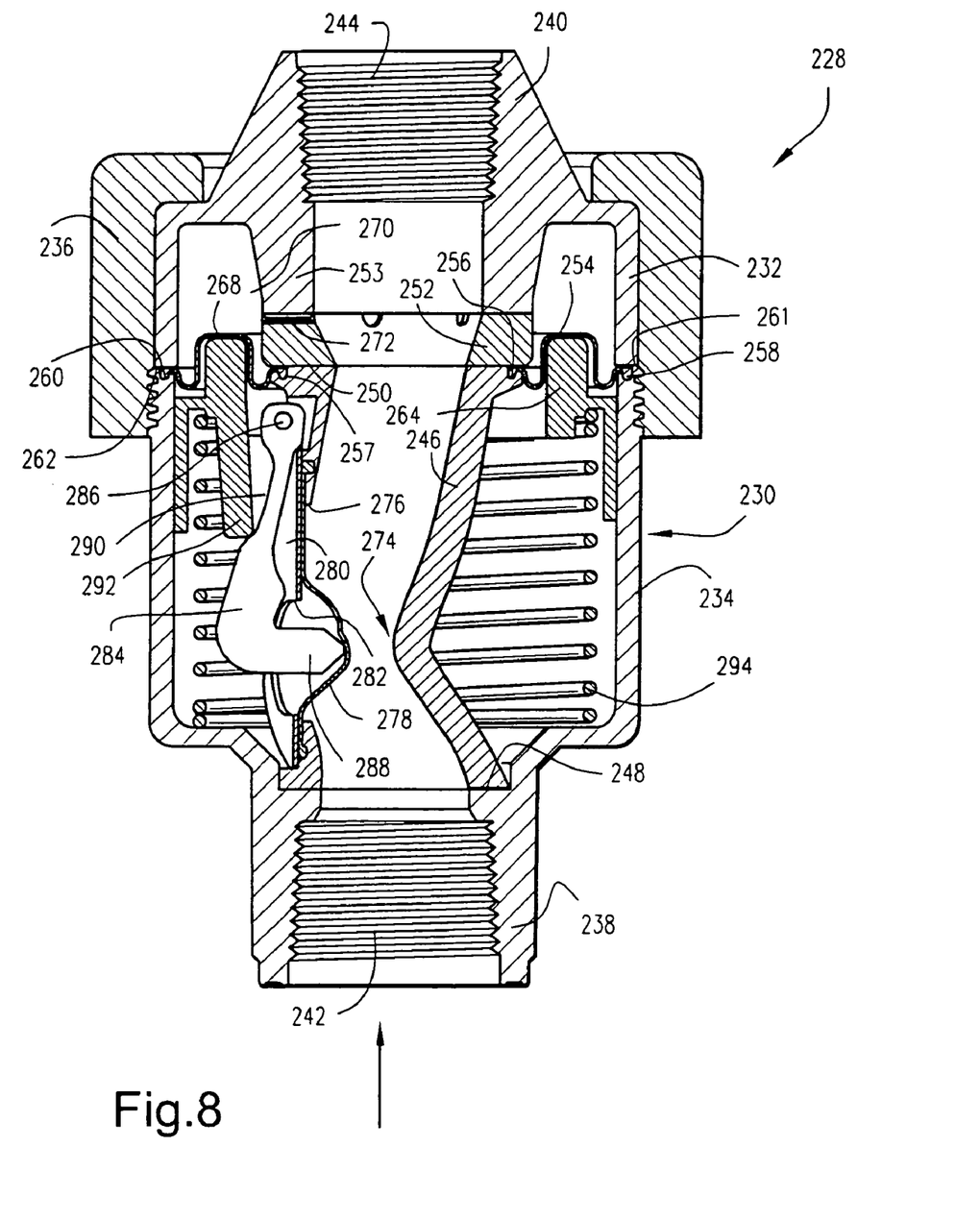
FIG. 8 is a longitudinal cross section of a pressure regulator in accordance with a third embodiment of the invention.

In FIG. 8, still another variant of the invention is shown. In this embodiment, the fluid pressure regulator 228 includes a tubular housing 230 that is again made up of a cap component 232 and a main body component 234 secured together by means of a donut-shaped, threaded clamp ring 236 as in the previously described embodiments.

The pressure regulator 228 also has an inlet end 238 and an outlet end 240. The inlet end 238 is also threaded internally at 242 to facilitate attachment to variously sized hoses or other conduits, but again, the arrangement may be reversed.

The outlet end 240 is also illustrated with internal threads 244 that are adapted to receive the external threads on a rotary sprinkler, fixed spray head or other suitable device.

A rigid flow tube 246 is fixedly secured between an internal flange 248 in the main body 234 and a lower edge 250 of an internal annular ring component 252 located adjacent an annular internal flow passage wall 253 formed integrally with the cap component 232.

An annular diaphragm 254 includes respectively radially inner and outer thickened ring portions 256, 258. The inner ring 256 is seated in annular groove 257 and is also held in place by lower edge 250 of the internal annular ring component 252. The outer ring 258 is seated in an annular groove 260 in the upper edge 261 of the main body component 234 and clamped in place by the lower edge 262 of the cap component 232.

An annular piston 264 is located in the housing 230 for reciprocating, axial movement. The piston has an upper, annular edge 268 that engages the underside of the annular diaphragm 254 and moves in response to flow pressure in the annular chamber 270 above the diaphragm. A plurality of annularly-spaced passages 272 extend through the internal ring component 252 and provide communication between the outlet end of the regulator and the chamber 270.

The rigid flow tube 246 is formed with a double bend or directional offset 274 axially between opposite ends of the tube, directing flow to one side of the housing and then back to the center of the housing. An opening 276 is provided in the rigid tube, adjacent the bend 274. A flexible boot 278 is located over the opening 276 and is held in place by a relatively rigid plate 280, fixed in place by any suitable means. The latter is formed with an opening 282 permitting access to the flexible boot 278. A pinch arm 284 is fixedly secured to the downstream end of the rigid flow tube via pin 286, with a transverse pinch tab 288 arranged to project through the opening 282 and into engagement with the flexible boot 278. The pinch arm is formed along its length with a cam surface 290 that is adapted to be engaged by a lower extended skirt portion 292 of the piston 264. Operation of the regulator is similar to the earlier-described embodiments, but in this case, the single movable pinch tab 288 acts in concert with the diametrically opposed wall of the fixed bend 274 to restrict flow through the flow tube 246. As in the previous embodiments, the regulator will continuously adjust, seeking an equilibrium position so that a constant outlet pressure is achieved, based on the outlet pressure in chamber 270 balanced against the force of coil spring 294.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluid pressure regulator comprising a regulator housing having an inlet end and an outlet end; a flow tube extending between said inlet end and said outlet end, said flow tube incorporating a double bend intermediate opposite ends of said flow tube, and having an opening therein on one side of said double bend; a flexible boot covering said opening; a hollow piston located at a downstream location relative to a mid-portion of said flow tube in a direction of flow of fluid through the regulator housing; a first chamber above said piston, and at least one passage establishing fluid communication between said outlet end and said first chamber; and a pinch arm pivotally mounted at one end within said regulator housing and movable in response to movement of said piston by an increase in fluid pressure in said first chamber so that an opposite end of said pinch arm will project through said opening and move said flexible boot towards the other side of said double bend to thereby restrict flow through said flow tube.

2. The fluid pressure regulator of claim 1 wherein said pinch arm is formed with a cam surface engageable by a lower end of said piston.

3. The fluid pressure regulator of claim 1 and further comprising a coil spring extending axially between said piston and a shoulder of said main body component.

4. The fluid pressure regulator of claim 1 wherein said at least one pinch arm further comprises a tab extending substantially perpendicularly to said at least one pinch arm, said tab adapted to engage said flow flexible boot.

5. The fluid pressure regulator of claim 1 wherein said first chamber is defined in part by an annular diaphragm extending between said piston and said regulator housing.

* * * * *